United States Patent
Håkansson et al.

(10) Patent No.: US 11,643,776 B2
(45) Date of Patent: May 9, 2023

(54) METHOD FOR MANUFACTURING A COMPOSITION COMPRISING MICROFIBRILLATED CELLULOSE

(71) Applicant: Stora Enso OYJ, Helsinki (FI)

(72) Inventors: Philip Håkansson, Sölvesborg (SE); Kaj Backfolk, Lappeenranta (FI); Isto Heiskanen, Imatra (FI)

(73) Assignee: Stora Enso OYJ, Helsinki (FI)

(*) Notice: Subject to any disclaimer, the term of this patent is extended or adjusted under 35 U.S.C. 154(b) by 133 days.

(21) Appl. No.: 16/977,159

(22) PCT Filed: Feb. 18, 2019

(86) PCT No.: PCT/IB2019/051288
§ 371 (c)(1),
(2) Date: Sep. 1, 2020

(87) PCT Pub. No.: WO2019/166912
PCT Pub. Date: Sep. 6, 2019

(65) Prior Publication Data
US 2021/0062418 A1    Mar. 4, 2021

(30) Foreign Application Priority Data
Mar. 2, 2018 (SE) .................... 1850231-0

(51) Int. Cl.
*D21C 9/00* (2006.01)
*C08B 15/08* (2006.01)
(Continued)

(52) U.S. Cl.
CPC ............ *D21C 9/004* (2013.01); *C04B 16/02* (2013.01); *C08B 15/08* (2013.01); *D21H 11/18* (2013.01)

(58) Field of Classification Search
CPC ........ D21H 11/18; D21C 9/004; C04B 16/02; C04B 12/04; C08B 15/08; C08L 1/02
(Continued)

(56) References Cited

U.S. PATENT DOCUMENTS 1,765,774 A    6/1930   Rose
5,240,561 A    8/1993   Kaliski
(Continued)

FOREIGN PATENT DOCUMENTS

CN    102378839 A    3/2012
CN    105051289 A    11/2015
(Continued)

OTHER PUBLICATIONS

S. Music, et al., Precipitation of Amorphous SiO2 Particles and Their Properties, Brazilian Journal of Chemical Engineering, vol. 28, No. 01, pp. 89-94, Jan.-Mar. 2011.

*Primary Examiner* — Coris Fung
*Assistant Examiner* — Ritu S Shirali
(74) *Attorney, Agent, or Firm* — Greer, Burns & Crain, Ltd.

(57) ABSTRACT

The invention discloses a method to form a composition, which method includes fibrillating fibers to form MFC in the presence of an alkali-metal silicate whereby an MFC and silicate mixture is formed The presence of alkali-metal silicate during fibrillation of fibers to MFC, reduces the viscosity and increases the water release behavior, whereby the fibrillation can be accomplished at higher concentrations and a more uniform mixture of MFC-silicate is accomplished. The composition formed by the method of the invention may e.g. be used in paper or paperboard production, in cement production or as an additive in composites.

12 Claims, 1 Drawing Sheet

(51) Int. Cl.
*D21H 11/18* (2006.01)
*C04B 16/02* (2006.01)

(58) Field of Classification Search
USPC .......................................................... 106/805
See application file for complete search history.

(56) References Cited

U.S. PATENT DOCUMENTS

| | | | |
|---|---|---|---|
| 8,372,320 B2* | 2/2013 | Gardner | C08L 1/02 162/10 |
| 10,294,371 B2* | 5/2019 | Gane | D01D 5/423 |
| 10,301,774 B2 | 5/2019 | Gane et al. | |
| 2005/0239744 A1 | 10/2005 | Ioelovich et al. | |
| 2011/0260348 A1 | 10/2011 | Gardner et al. | |
| 2013/0047893 A1 | 2/2013 | Heiskanen et al. | |
| 2013/0053454 A1* | 2/2013 | Heiskanen | C09D 101/284 106/501.1 |
| 2014/0370179 A1 | 12/2014 | Gane et al. | |
| 2015/0045549 A1* | 2/2015 | Laukkanen | C08L 1/02 536/85 |
| 2015/0064491 A1 | 3/2015 | Phipps et al. | |
| 2015/0158955 A1 | 6/2015 | Graveson et al. | |
| 2015/0330024 A1 | 11/2015 | Gane et al. | |
| 2016/0032530 A1 | 2/2016 | Virtanen | |
| 2017/0007340 A1 | 1/2017 | Swensgard et al. | |
| 2017/0284030 A1 | 10/2017 | Svending et al. | |
| 2018/0094081 A1* | 4/2018 | Nuopponen | A61L 2/04 |

FOREIGN PATENT DOCUMENTS

| | | | |
|---|---|---|---|
| EP | 2236664 A1 * | 10/2010 | A61P 17/02 |
| JP | H05506179 A | 9/1993 | |
| JP | 2013527876 A | 7/2013 | |
| JP | 2014088478 A | 5/2014 | |
| JP | 2015518512 A | 7/2015 | |
| WO | 200701942 A1 | 8/2007 | |
| WO | 2011004284 A1 | 1/2011 | |
| WO | 2014106684 A1 | 7/2014 | |
| WO | 2014132119 A1 | 9/2014 | |

* cited by examiner

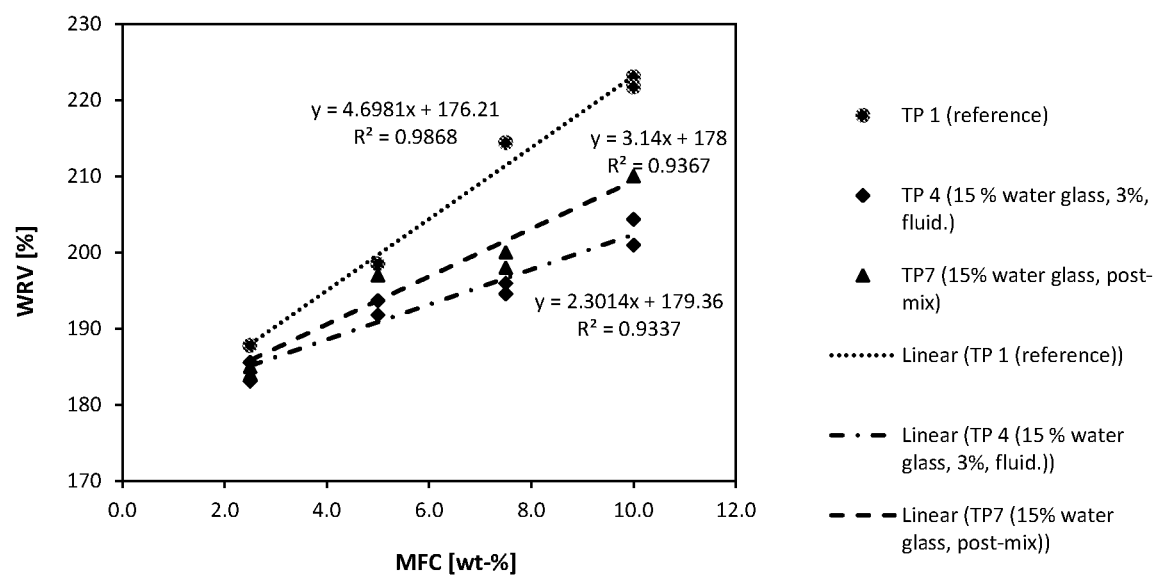

METHOD FOR MANUFACTURING A COMPOSITION COMPRISING MICROFIBRILLATED CELLULOSE

This application is a U.S. National Phase under 35 U.S.C. § 371 of International Application No. PCT/IB2019/051288, filed Feb. 18, 2019, which claims priority under 35 U.S.C. §§ 119 and 365 to Swedish Application No. 1850231-0, filed Mar. 2, 2018.

TECHNICAL FIELD

The present invention relates to a method for manufacturing a composition comprising microfibrillated cellulose, a composition produced according to the method and the use thereof.

BACKGROUND

In recent time, there has been an increased interest in using microfibrillated cellulose (MFC) in several industrial applications. In paper- and board making MFC may e.g. be used to increase the strength of the product to enable source reduction or to enhance retention. In cement and concrete applications, MFC may be used to provide reinforcement, to control dewatering or drying or to adjust rheological properties. MFC can further be used in a number of composite applications such as in adhesives, coatings, films, paints and packaging.

MFC is usually produced from cellulose fibers by fibrillating the fibers by use of e.g. homogenization, microfluidization, grinding, refining or beating. Pre-treatment, such as enzymatic, chemical or mechanical pre-treatment, is preferably used to reduce energy of fibrillation or to introduce functional groups and to adjust physical dimension of the MFC. A number of different methods to enhance fibrillation or to reduce fibrillation energy have been proposed. WO2007091942 discloses a method for manufacturing MFC by enzymatic treatment followed by homogenization. In WO2014106684 MFC is produced by fibrillation of fibrous pulp in several steps at different consistencies. WO2011004284 discloses a process to produce MFC by simultaneous enzymatic and mechanical treatment.

One problem connected with the industrial use of MFC is that it has a very high water binding capacity and therefore releases water slowly. Due to its characteristic physical and chemical properties, the production of MFC leads to aqueous suspensions with very low solid contents (typically around 0.1-3 wt %). Transportation or processing (mixing, dewatering, drying, pumping) of MFC with such low solid contents is not sustainable or cost-efficient. The drying or dewatering of MFC to high solid contents may further deteriorate its properties e.g. cause wet hornification and change its performance.

In water and at higher concentrations (>1 wt %) MFC forms a gel. A problem with an MFC gel is that mixing it into a composite, containing one or several other reactive chemicals, requires high intensity mixing and controlled reaction conditions. In cases where MFC is used as an active precursor or as a reagent or carrier material, it is essential that the dosing is optimized to avoid competitive reactions or formation of by-products or other intermediate chemicals. One example of one such a reactive chemical is sodium silicate, which reaction with cellulose or modified cellulose requires controlled conditions. In certain applications, it is beneficial to add MFC at medium or high consistency, which makes dispersion of the MFC critical. Separate dosing of MFC and sodium silicate causes formation of multiple products or intermediates which usually influence the properties of the end product negatively.

One example of this is the addition of low consistency MFC to process flows such as papermaking stock. The challenge connected to such addition is how to achieve flocculation, controlled interaction (such as quantitative retention) and an even distribution of the additives and components in the suspension and in the formed product thereof. Inadequate retention of additives may cause runnability and quality problems.

WO2014132119 discloses a method for inline production of a retention agent. The patent describes polymerization of an aqueous silicate to colloidal silica in the presence of MFC. The MFC may be fed to the stock suspension separately to the feeding of the silicate and an acidic media or as a pre-mix.

However, there remains a need to both render the industrial production and use of MFC more efficiently and to provide improved mixing, re-dispersion and handling of MFC.

SUMMARY OF THE INVENTION

According to a first aspect, the invention discloses a method for manufacturing a composition, which method includes fibrillating fibers to form MFC in the presence of an alkali-metal silicate whereby an MFC and silicate mixture is formed. The alkali-metal silicate is preferably added to the fiber suspension prior to or during the fibrillation thereof.

The presence of alkali-metal silicate during fibrillation of fibers to MFC, reduces the viscosity and improves the dewatering efficiency, whereby the fibrillation can be accomplished at higher concentrations and a more uniform mixture of MFC-silicate is accomplished. The composition formed by the method of the invention may thus comprise higher solid contents than MFC produced according to conventional techniques usually does, whereby the transportation and processing of such a composition is more effective. Moreover, the MFC-silicate mixture produced in accordance with the invention enables controlled addition of the components into process flows whereby undesired side reactions are avoided. It has further been shown, that the method of the invention prevents a strong MFC gel to be formed and facilitates the re-dispersing of MFC into water.

The alkali-metal is preferably sodium silicate (water glass). Other alkali-metals may alternatively be used, such as calcium, potassium and/or lithium. However sodium is preferred due to its cost-efficiency, reactivity and alkalinity.

The fibrillation is preferably done to generate an MFC and silicate mixture having an SR (Schopper-Riegler) value of above 40, preferably above 50, or most preferably above 60.

The method may further include the step of mixing fibers with alkali-metal silicate prior to and/or during fibrillation. In one embodiment, the fibers to be mixed with alkali-metal silicate and fibrillated have an SR value of between 15-80, preferably between 25-70 or between 35-70, prior to the steps of mixing and fibrillating. In this embodiment, the method may comprise a step of pre-fibrillating the fibers before being mixed with the alkali-metal silicate. In this way, the process may be optimized and made more cost efficient.

The alkali-metal silicate is preferably present in an amount of 1-99 wt %, preferably in an amount of 1-90 wt %, most preferably 1-80 wt % based on the total solid content of the fibers. The ratio silicate/fibers depend on the end-use.

In one embodiment, the alkali-metal silicate is preferably present in an amount of 1-15 wt %, such as between 1-10 wt % or 5-10 wt %.

In one embodiment, the method further comprises the step of dewatering the mixture to a solid content of at least 3 wt %, at least 5 wt %, at least 10 wt %, or even at least 15 wt % or at least 20 wt %. The final solid content further depends on the ratio silicate/MFC. In embodiments wherein silicate is present in an amount of at least 1-10 wt %, the mixture is dewatered to solid content of e.g. between 3 wt %-20 wt %, or at least 5-20 wt % or 10-20 wt %, while in embodiments wherein silicate is present in higher amounts, the final solid content can also be higher.

In one embodiment, the initial pH (i.e. the pH when the fibrillation process is started) is above 5, preferably above 6 or above 7. In this way, the fibers may be swollen and more available to the treatment. In some embodiments, the pH is between 9.5-14 or 10-14, preferably between 10-13 during the fibrillation.

In another embodiment, the initial pH is below 5, such as in the range of 1-5. In this embodiment, an acid may be added to the fiber suspension after the addition of water glass but before the fibrillation. In this way, the dewatering resistance is reduced even further.

In one embodiment pigments, such as calcium carbonate kaolin, bentonite, plastic pigments, starch pigments, nanoclays, PCC and/or talcum, are present during the fibrillation.

After the step of fibrillating, an acidic media may be added to the MFC and silicate mixture whereby anionically charged colloidal particles are formed, which at least partly are precipitated on the MFC fibers. These colloidal particles may be added as such or in combination with a cationic polymer to a process flow, e.g. a papermaking furnish. This forms an effective retention system. The acidic media may be any one of mineral acids such as sulphuric acids, phosphoric acids, hydrochloric acids; acidic metal salts such as polyaluminium chloride (PAC) and/or carbon dioxide. The acidic media is preferably added to lower the pH to below 9, or below 7 or below 6 or below 5 or even below 3. The pH may e.g. be lowered to between 1-6, or 1-5. Optionally, the temperature is further raised to at least 25° C., or at least 45° C. or at least 65° C. prior to or simultaneously as the treatment of the MFC and silicate mixture with an acidic media. The pH during fibrillation and after the acidification is dependent on the amount of water glass added and other co-additives in the suspension. Preferably, the pH should be lowered by at least one or at least two units at the acidification of the MFC and silicate mixture.

In a second aspect, the invention discloses a composition produced by the method according to the invention.

In a third aspect, the invention discloses the use of the composition in paper or paperboard production. The composition comprising silicate-MFC may e.g. be added to the paper or paperboard furnish to enhance the strength of the thus produced paper or paperboard. The composition may further be added together with a cationic polymer to the paper or paperboard furnish to provide an efficient retention system.

The composition may also be used in cement production or in the production of composites for further use in e.g. adhesives, coatings, films, paints, detergents and packaging. Other possible end-uses include as additive in deinking processes or in pulp beaching.

DETAILED DESCRIPTION

In accordance with the present invention cellulose fibers are fibrillated to form microfibrillated cellulose, which fibrillation is performed in the presence of an alkali-metal silicate.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., Cellulose fibres, nanofibrils and microfibrils: The morphological sequence of MFC components from a plant physiology and fibre technology point of view, Nanoscale research letters 2011, 6:417), while it is common that the aggregated form of the elementary fibrils, also defined as microfibril (Fengel, D., Ultrastructural behavior of cell wall polysaccharides, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 m2/g, such as from 1 to 200 m2/g or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

In accordance with one embodiment of the invention, a suspension comprising cellulose fibers and an alkali-metal silicate is fibrillated. The alkali-metal silicate may be added to a suspension comprising cellulose fibers prior to or during fibrillation. The alkali-metal silicate may be added as a solution with a solid content of at least 5 wt % or at least 10 or at least 15 wt % to the fiber suspension. The cellulose fibers may be hardwood and/or softwood fibers. The fibrillation can be accomplished by use of e.g. a homogenizator, preferably at a consistency of 1-4% by weight, in a super refiner, preferably at a consistency on of 1-10% by weight or by mechanical treatment in a compactor, shredder, refiner, defibrator, screw, pulper, pump, or high shear mixing devices, at a preferred consistency of between 5-30% by weight.

In one embodiment, the temperature is raised to above 30° C., or above 50° C. or preferably above 75° C. prior to or during the fibrillation.

Optionally, the method further comprise a pre-treatment step, prior to the fibrillating step, which pre-treatment step may comprise enzymatic or mechanical pre-treatment.

Example 1

A trial series was performed in which the dewatering resistance of MFC containing compositions produced according to the invention (sample 2-6) were compared with reference MFC compositions (sample 1 and sample 7). Reference sample 1 is MFC made from 100 wt % kraf fibers, without the addition of water glass. Reference Sample 7 is a mixture of MFC made from kraft fibers and water glass, wherein the MFC and the water glass have been mixed after refining (post-mixing). Reference samples 2-6 are compositions according to the invention wherein kraft fibers have been fibrillated in the presence of water glass.

The experiments were made using fiber suspensions of kraft fibers (pine) which were pretreated by wet disintegration at 3 wt % consistency at 30000 revs (British standard wet disintegrator).

The pH of the fiber suspensions were adjusted to approximately 9.5 before addition of sodium silicate. Water glass (sodium silicate) was added to the samples 2-6 prior to fibrillation. The water glass added was sodium silicate (Dry cont. 50.17 wt %, Be 48-50, Density 1.40-1.52 kg/dm3, $SiO_2$, $Na_2O$ molar ratio 2-2.1). The process conditions prior and after fibrillation are shown in table 1. The amount of water glass added is calculated based on the total amount of fibers in the suspensions before fibrillation (20 means 20 wt % of the dry amount of fibers). The "pH, initial" refers to the pH after the addition of sodium silicate but prior to fibrillation. In Sample 6, the pH was adjusted to 3.9 by the addition of sulphuric acid prior to the fibrillation.

The fiber suspensions were fibrillated by fluidization. Fluidization was made by running the suspension 2 times through 400/200 micron chambers and then one time through a 200/100 micron chambers (Microfluidizer). No adjustment of the temperature was done before or after the trials.

TABLE 1

| Sample | 1 (ref) | 2 | 3 | 4 | 5 | 6 | 7 |
|---|---|---|---|---|---|---|---|
| Kraft Fiber [wt %] | 100 | 100 | 100 | 100 | 100 | 100 | 100 |
| Water glass [wt %] | 0 | 5 | 15 | 15 | 15 | 15 | 15 |
| Fluidization | 3x | 3x | 3x | 3x | 3x | 3x | 3x, post mixing |
| pH, initial | 9.5 | 10.7 | 11.0 | 11.2 | 11.4 | 3.9 | |
| PH, final | 7.09 | 10.64 | 10.81 | 11.27 | 11.39 | 3.8 | 11.01 |
| Starting consistency [wt %] | 1.0 | 1.0 | 1.0 | 2.96 | 4.43 | 4.86 | 1.5 |

To investigate the dewatering resistance, the reference MFC Sample 1, the MFC-water glass samples of the invention (samples 2-6) and the reference Sample 7 (post mixing), respectively were dewatered by a vacuum filtration device equipped with 0.65 μm DVPP filter. Prior to the filtration, the samples were diluted to 0.1 wt % consistency using RO water. The mixing were carried out using a rod mixer (30 sec) followed by magnetic stirring for at least 2 minutes. The diluted suspension was poured into the vacuum filtration funnel. The time recorder was started at the same time while initiating the vacuum suction. The time required to the visible water layer to disappear from the top of the fibril pad (film) was monitored (=dewatering time). The results for the references and the samples of the invention are shown in table 2.

TABLE 2

|  | 1 (ref) | 2 | 3 | 4 | 5 | 6 | 7 |
|---|---|---|---|---|---|---|---|
| Filtration time, [Sec] (30 gsm) | 843 | 373 | 209 | 131 | 130 | 95 | 169 |
| Dry content of drainage filter cake | 25.90 | 26.23 | 24.57 | 27.15 | 26.78 | 27.23 | 26.44 |

The results clearly show that the dewatering resistance is significantly reduced due to the co-fibrillation according to the invention.

Example 2

Another test series was performed to investigate the water retention value (WRV) of the compositions of the invention.

The reference MFC Sample 1, the Sample 4 of the invention and the reference post-mixing Sample 7 (all produced as in example 1 but with a fluidization concentration of 3%) were mixed with bleached never-dried birch kraft pulp (unrefined) in accordance with Table 3, wherein TP 1 refers to a mixture of Sample 1 with kraft pulp, TP 4 refers to a mixture of Sample 4 with kraft pulp and TP 7 refers to a mixture of Sample 7 with kraft pulp.

TABLE 3

| Test Point (TP) | MFC, [wt %] | WRV [%] | Approximate time of cake forming, [min] |
|---|---|---|---|
| 1 | 2.5 | 188 | 15 |
| 1 | 5.0 | 199 | 27 |
| 1 | 7.5 | 214 | 33 |
| 1 | 10.0 | 222 | 48 |
| 4 | 2.5 | 184 | 6 |
| 4 | 5.0 | 193 | 8 |
| 4 | 7.5 | 195 | 10 |
| 4 | 10.0 | 203 | 10 |
| 7 | 2.5 | 185 | 6 |
| 7 | 5.0 | 197 | 10 |
| 7 | 7.5 | 199 | 12 |
| 7 | 10.0 | 210 | 12 |

Pulp pads for centrifugation were formed using a vacuum filtration device equipped with a 0.65 μm DVPP filter. The cakes with approximately 7-15 wt % dry content were subjected to centrifugation and the water retention value was determined in accordance with SCAN-C 62:00. The results are shown in Table 3.

FIG. 1 shows how the water retention value changes with increased MFC content for the different test points. WRV for the samples comprising 100 wt % MFC were calculated using extrapolation of the trendlines from the chart shown in FIG. 1 (Table 4).

TABLE 4

| TP | WRV [%] |
|---|---|
| 1 | 646.02 |
| 4 | 409.50 |
| 7 | 492.00 |

As can be seen in FIG. 1 and in table 4, the water retention value of the compositions made in accordance with the invention (TP 4) are significantly lower than the water retention value of the references (TP4 and TP7), especially at higher MFC contents.

The invention claimed is:

1. A method for manufacturing a composition, the method comprising:
fibrillating fibers to form microfibrillated cellulose (MFC), wherein the fibrillating is performed in the presence of an alkali-metal silicate, and wherein an MFC and silicate mixture is formed, wherein an initial pH is in a range of 1-5.

2. The method according to claim 1, wherein the alkali-metal silicate is sodium silicate.

3. The method according to claim 1, wherein the method further comprises:
mixing the fibers with the alkali-metal silicate prior to or during fibrillation, and wherein the fibers to be mixed with alkali-metal silicate and fibrillated have an SR value of between 15-80.

4. The method according to claim 1, wherein alkali-metal silicate is present in an amount of 1-99 wt % based on the total solid content of fibers.

5. The method according to claim 1, further comprising:
dewatering the MFC and silicate mixture to a solid content of at least 3 wt %.

6. The method according to claim 1, wherein pigments are present during the fibrillating.

7. The method according to claim 1, further comprising:
adding an acidic media to the MFC and silicate mixture after fibrillation.

8. The method according to claim 1, wherein the method further comprises:
mixing the fibers with the alkali-metal silicate prior to or during fibrillation, and wherein the fibers to be mixed with alkali-metal silicate and fibrillated have an SR value of between 25-70.

9. The method according to claim 1, wherein alkali-metal silicate is present in an amount of 1-90 wt % based on the total solid content of fibers.

10. The method according to claim 1, wherein alkali-metal silicate is present in an amount of 1-80 wt % based on the total solid content of fibers.

11. The method according to claim 1, further comprising:
dewatering the MFC and silicate mixture to a solid content of at least 5 wt %.

12. The method according to claim 1, further comprising:
dewatering the MFC and silicate mixture to a solid content of at least 10 wt %.

* * * * *